US007001507B2

(12) United States Patent
Orozco et al.

(10) Patent No.: US 7,001,507 B2
(45) Date of Patent: Feb. 21, 2006

(54) RETENTION AND REMOVAL OF DEBRIS AND POLLUTANTS FROM SURFACE WATER RUNOFF

(75) Inventors: Michael M. Orozco, Glendora, CA (US); John K. Pickrell, Alta Loma, CA (US)

(73) Assignee: Carson Industries LLC, Glendora, CA (US)

( * ) Notice: Subject to any disclaimer, the term of this patent is extended or adjusted under 35 U.S.C. 154(b) by 247 days.

(21) Appl. No.: 10/443,423

(22) Filed: May 22, 2003

(65) Prior Publication Data

US 2004/0232057 A1 Nov. 25, 2004

(51) Int. Cl.
*E03F 5/00* (2006.01)
(52) U.S. Cl. .................. 210/164; 210/86; 210/170; 210/238; 210/254; 210/262; 210/297; 210/316; 210/337; 210/474

(58) Field of Classification Search ............... 404/2, 404/4, 5; 210/163, 164, 86, 170, 474, 254, 210/259, 260, 262, 337, 338, 747, 316, 297, 210/359, 257.1, 238
See application file for complete search history.

(56) References Cited

U.S. PATENT DOCUMENTS

| 6,200,484 B1 * | 3/2001 | McInnis ................. 210/693 |
| 6,537,447 B1 * | 3/2003 | Remon ................... 210/163 |
| 2005/0000872 A1 * | 1/2005 | Middleton et al. ........ 210/163 |

* cited by examiner

*Primary Examiner*—Terry K. Cecil
(74) *Attorney, Agent, or Firm*—Donald D. Mon

(57) ABSTRACT

A system to restrict and remove debris and pollutants from runoff water received from surrounding areas. A receptacle receives the runoff water, and a grate detains the heavier part of its solids burden. A first screen within the receptacle detains solids of lesser size. Water passed by the first screen encounters a tubular second screen in the receptacle which passes water that was additionally screened by it and sends it to a downstream system. A weir at a sensitive level in the receptacle can by-pass the second screen. The second screen is preferably rotatable.

14 Claims, 3 Drawing Sheets

RETENTION AND REMOVAL OF DEBRIS AND POLLUTANTS FROM SURFACE WATER RUNOFF

FIELD OF THE INVENTION

Retention and removal of debris and pollutants from surface water runoff.

BACKGROUND OF THE INVENTION

Treatment of surface water runoff to remove solid debris and pollutant content is a relatively simple matter when water flow is gradual, whether slow flow, steady flow, or occasional moderate flow. Installations in places such as golf courses, especially in temperate regions, apply water sparingly, and are only infrequently subjected to very heavy rainfall.

During their periods of moderate exposure to rainfall, routine maintenance largely attends to the gradual accumulation of solid materials such as cuttings, branches and the like, and the gradual deposition of pollutants such as oils, pesticides and fertilizers. Regular maintenance will attend to most of these.

If these were the only circumstances, the instant invention would rarely be justified, because there would seldom if ever be a sudden load washed into a drainage system. Indeed, many or most golf courses already have installed drainage systems with these parameters in mind. They simply provide surface drains that lead to storm drain systems, creeks, or rivers without concern for overload, because a heavy load occurs so infrequently as to be tolerable.

Now this tolerance for overload has radically changed. Very recent statutes now exist which forbid or stringently limit the discharge of debris and pollutants into drains regardless of their infrequency. Society's tolerance for solids and pollutants in storm drain systems has been utterly and irreversibly changed.

Again, gradual accumulation of debris and pollutants can reasonably be attended to by street sweeping, routine cleaning of drainage basins, proper maintenance of parking lots, and proper disposition of area trimmings, deposits and pollutants. However, the consequences of heavy storm run-offs are quite different, especially in areas where routine maintenance still can harbor an accumulated burden which would normally have been attended to by routine measures, but which in a heavy storm could wash into the drain system all at once. A large amount of storm water carries with it and dumps into the system a burden which otherwise would have been attended to before it could have reached the drainage system.

Here is where the very evident and objectionable results occur. Storm drains become clogged, surrounding areas become flooded, and accumulated pollutants arrive all at once, and what then does pass through is the accumulated burden of what would normally have been stopped before the storm. The system is simply overwhelmed, and the downstream regions receive all of this material.

With increasing public awareness, the acceptance of trash and pollutants downstream in rivers, lakes, bays and beaches has ended. Instead it has now become the task of proprietors of existing installations to find an affordable system to comply with the new societal imperatives.

It is the problem of the proprietor to install in his activities a system which is at once affordable and sufficient.

It is an object of this invention to provide an affordable system which can readily be incorporated into existing drainage systems, or as a part of a new one.

It is another object of this invention to provide systems which can readily be serviced, and which, in a relatively small bulk can provide a barrier to most or all of the burden in a heavy flow of water from a substantial surrounding area.

BRIEF DESCRIPTIONS OF THE INVENTION

This invention includes a sub-grade receptacle disposed and arranged in an extensive region toward which surface water will flow. Its objective is to receive this water and its burden, but to pass to an ultimate drainage system the water, but only after barring much of the solid burden and at least some of the pollutants. The restricted substances then will be disposed of as they would ordinarily have been, without having been washed into the downstream system by the heavy flow.

According to this invention, a grate across the top of the receptacle will prevent solid material of larger size from even entering the receptacle.

The receptacle includes an outlet discharging into a downstream drainage system.

A first screen is placed in said receptacle below the grate, forming a screening barrier ahead of the drainage system, preferably as a part of the wall and bottom of a basket which is readily removable from the receptacle for emptying. This first screen has passages sized to restrict particles of lesser size than were restricted by the grate. This will remove most of the objectionably large particles.

According to a preferred but optional feature of this invention, a second screen is provided as a hollow structure extending into the receptacle downstream from the first screen. It is a finer screen with pores or passages sized to restrict smaller particles, on the order of sand and silt. Flow is from the outside of the second screen into its hollow center, and then into the drainage system.

According to yet another preferred but optional feature of the invention, the second screen extends horizontally into the receptacle where it can readily be removed and replaced, and whose outer surface will be washed by much of the water flow, thereby retarding the clogging of the second screen. If desired, the second screen may be rotatable, so as to encourage solids to fall off of its outer surface when rotated and present a freshened upwardly facing surface.

According to yet another optional feature of the invention, an absorptive or adsorptive boom may be placed in the receptacle to absorb or adsorb pollutants, such as hydrocarbons. Such a boom can readily be removed and replaced.

According to yet another preferred but optional feature of this invention, a supplementary screen is placed inside the second screen where it will screen water that has by-passed the second screen through a weir when the second screen is overwhelmed.

The above and other features of this invention will be fully understood from the following detailed description and the accompanying drawings, in which:

DETAILED DESCRIPTION OF THE INVENTION

Figure 1:
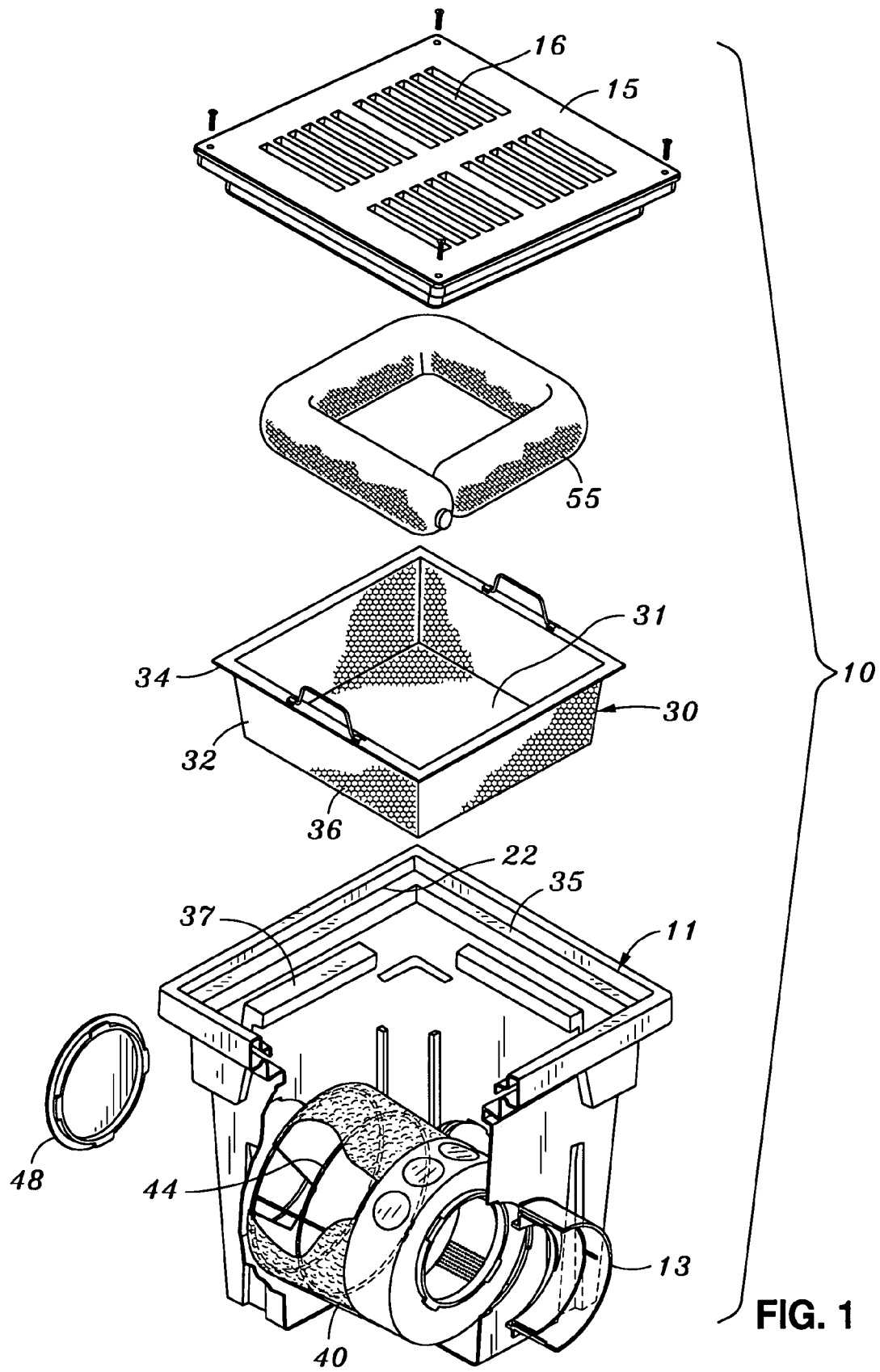
FIG. 1 is an exploded perspective view of the presently preferred embodiment of the invention.

A system 10 according to this invention includes a receptacle 11 intended to be placed beneath the surface 12 of a surrounding region. This region is graded to drain toward this receptacle, so that runoff water will enter the receptacle and through it pass into a drainage system shown schematically as a subsurface pipe 13 or other conduit.

The runoff water which reaches the receptacle is that which is not absorbed or otherwise restricted by the surrounding earth. In dryer times, and in light rains, there will be little or no runoff water. Importantly, absent substantial runoff flow, little burden will be transported to the receptacle. There will not be a sufficient body of flowing water to carry it. Similarly, pollutants such as fuel oils, engine oils, washing compounds, solid fertilizers, and excess fertilizers dried on surfaces, will simply remain in place, or at most gradually be brought to the receptacle at an acceptably slow rate. While these substances can and will be attended to by this system, generally they will be removed in the normal course of events before they can reach it.

The situation is very different when a storm or other source of heavy flow of water occurs. Then whatever is there, awaiting routine handling, is abruptly sent downstream toward the drainage system. To counter this circumstance, the receptacle has a grate 15, which may be quite coarse to stop relatively large solid pieces, such as twigs, branches and rocks. It has a plurality of apertures 16 sized to restrict large debris.

The receptacle has a bottom 20, a peripheral sidewall 21, and an open top 22 formed by a peripheral rim 23. Grate 15 can be fitted into the rim, rested on a shelf 24 near the top. This grate can readily be removed for cleaning and access.

A first screen 30 is formed as the bottom 31 and sides 32 of a basket. The basket has an external flange 34 that overlaps a shoulder 35 of the receptacle and also rests on supports 37 in sidewall 21 in the receptacle. Screen 30 comprises a large number of relatively small apertures 36. A convenient size for these apertures is a ⅛ inch diameter round opening. This basket can readily be removed, cleaned out and replaced when the grate is removed.

A second screen 40, which may be regarded as a filter extends into the receptacle. It is preferably formed as a hollow tube with a peripheral wall 41 and an end closure 42. The end closure may be self-material, or a plate across the end. This forms a central, hollow drainage region 43 inside the second screen. It is supported on a wire frame 44 attached to the sidewall. The frame may be circularly cylindrical or, if preferred for storage may have a small conical angle. The screen can readily be slipped onto and removed from the frame.

The second screen may conveniently be made of a woven fabric, preferably one which is resistant to mold. A preferred example is woven poly propylene fabric with interstices suitable to the intended usage, generally a rather close weave, but one which will readily pass the water and will not swell. Its porosity is such as to restrict particles larger than about 100 um. Some porous foam-like materials are also suitable.

Water from the first screen flows downwardly into the receptacle. When the water is sufficiently deep it flows through the second screen and out through an exit port 46 into pipe 13.

An alternate entrance port 47 is cut in the opposite wall. A closure plate 48 is provided to close it when it is not used. This enables connections into other pipes or systems.

While the second screen has been described as a horizontal cylinder, this is the preferred, but not necessary, embodiment. It is however advantageous, because water flowing from the first screen tends to flow over and wash the outside, thereby discouraging clogging of the screen.

The second screen and its outlet are disposed above the bottom of the receptacle. This leaves a sump region 50 in which sediment can accumulate. This sediment can later be suctioned out or scooped out when the screens are temporarily removed.

In its preferred embodiment, this system includes a boom 55 which is absorbent or adsorbent of pollutants such as hydrocarbons (especially fuel oil and engine oil). This boom is preferably placed around the edge of the basket where it will contact a large portion of the water flowing into the receptacle, especially at slower rates of flow. This boom is readily serviced merely by removing and replacing it from time to time. Any suitable material may be used for this purpose. Examples of suitable materials are polyolefins to which oils tend to adhere, synthetic sponges, and mats of fibrous material such as excelsior, cotton cloth, and any other material more selectively attractive to pollutants than to water.

Figure 2:
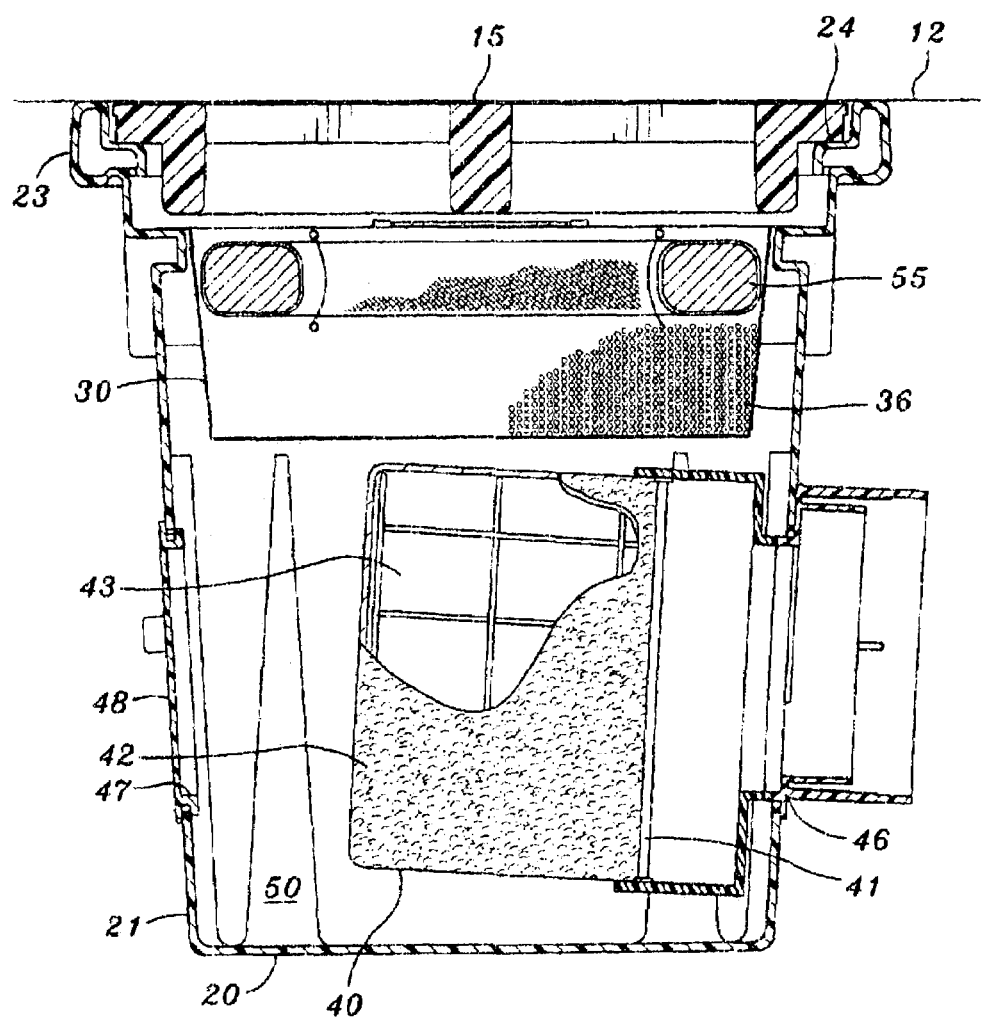
FIG. 2 is a vertical section partly in cutaway notation, of the assembled system of FIG. 1.
Figure 3:
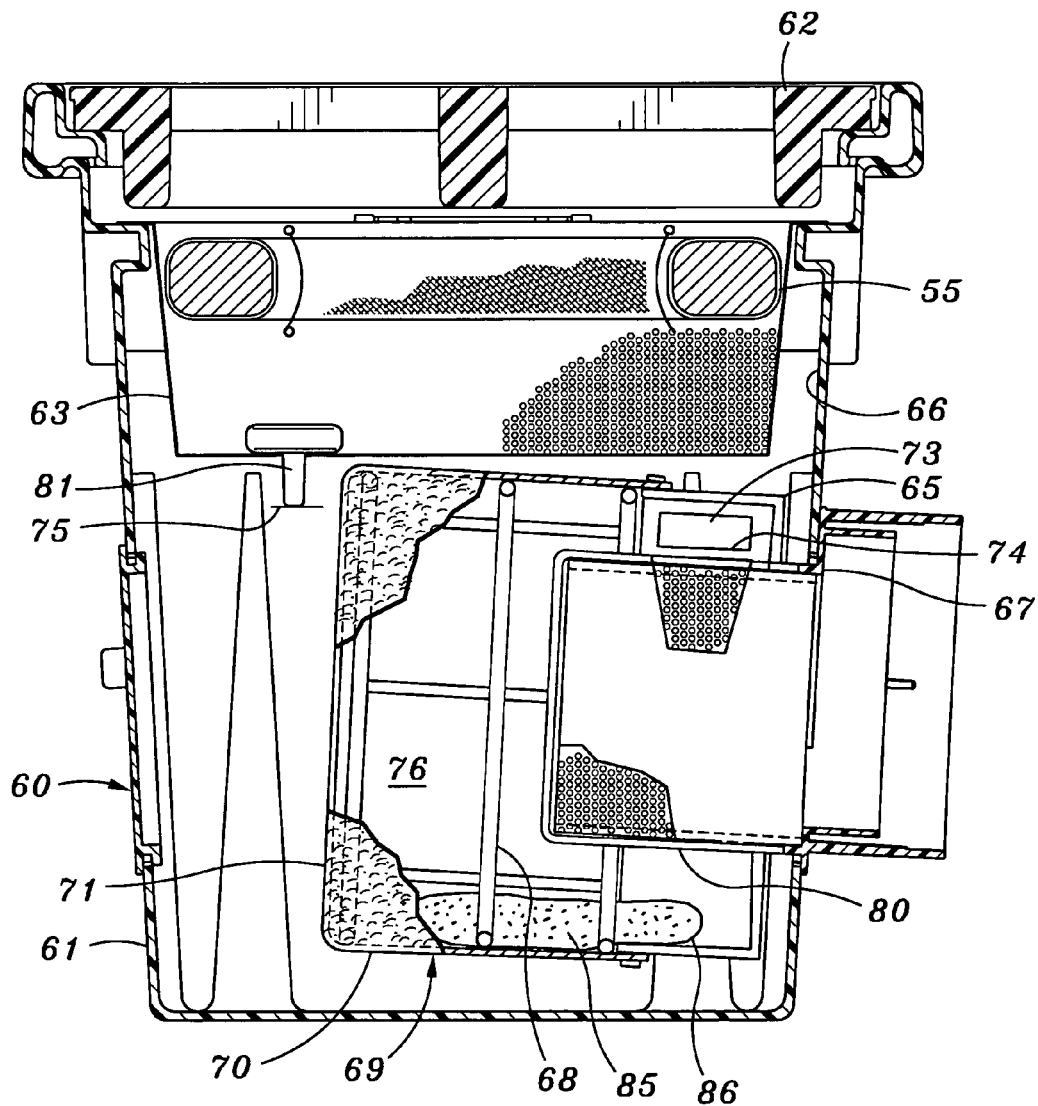
FIG. 3 is a section similar to FIG. 2 of another embodiment of the invention.

The apparatus shown in FIGS. 1 and 2 is adaptable to employ a number of useful additional features, as best shown in FIG. 3. System 60 includes a receptacle 61, a grate 62 and a first screen 63 identical to the corresponding parts of system 10.

A bracket 65 which is mounted to sidewall 66 around outlet port 67 mounts a frame 68 (the same as frame 44 in FIG. 1) over which a sleeve-like second screen 69 (the same as screen 40 in FIG. 1) is fitted. Second screen 69 has a tubular sidewall 70 formed of filtration material through which water will pass, leaving particulate matter in the receptacle. It has an end closure 71 which may be an impermeable plate, or filtration material as preferred. It may be made of the same material used in the second screen in FIG. 1.

The bracket has a plurality of weir openings 73 which form a weir 74 at a critical level 75 in the receptacle. This level may be reached by water when the second screen is plugged, or when the flow rate of the water exceeds that which can be accommodated by the second screen. At this level, water will flow not only through the second screen, but also through the weir opening, into the central region 76 inside the second screen. This can avert, or at least reduce flooding of the system.

However, it is not permissible to pass unscreened water into the drainage system. Accordingly, a supplementary filter 80 is mounted in region 76, around the exit port. It is mounted on a frame with a sleeve-like wall and an end closure in the same manner as the second screen. It is conveniently made of the same kind of material as the first screen, which is more open than the second screen.

The supplementary screen will pass water which was passed by the first screen without restraint. It is not intended to be a finer, second screen, but rather a by-pass around a clogged or overwhelmed second screen. While under these circumstances some water will be passed that has not been filtered through the second screen, it will still be clearer than the initial influent to the second screen. Furthermore it will be in place when the second screen is removed for servicing, thereby preventing the flow into the system of raw influent.

It will be noted that the second screen and the supplementary screen are series connected, water first flowing through the second screen, then through the supplementary screen, and then to the downstream outlet. This situation pertains for all flow except that which passes through the weir during overload conditions.

The accumulation in the sump of enough water to require by-pass through the weir reflects a problem such as a clogged second screen, and the need for prompt servicing. To alert personnel to this situation a sensor 81 of any suitable type is placed on or near the weir level. This may be any type of sensor, for example one which responds to immersion, and which can give notice of the need for servicing. The sensor may activate an alarm such as a sound, light or telephone notice. Any suitable system responsive to a sensor input may be utilized.

It may be useful to rotate the second screen so that solids can be washed from different parts of the screen from time to time. For this, the mounting bracket may be made rotatable, and a ratchet or other mechanical means can be provided to turn the second screen by incremental amounts. Otherwise the screen itself may be manually rotated or even motor-operated.

This invention provides the opportunity of further improvement of the effluent stream after it has passed the two prior screens and also boom 55. Water in the region inside the second screen has already been processed twice, first by the grate and then by the first and second screen. These principally attend to pieces and particles of debris and other entrained matter. In addition, boom 55 can restrict many pollutants.

This invention enables the further treatment of an already treated flow of water. As shown in FIG. 3, an attractant 85 of material may be placed in region 76 inside the second screen. It may be held in a flexible enclosure 86 such as a cloth bag, and will lie on the inside of the second screen. Water which flows through the second screen will encounter this attractant. Substances in the water which are attracted to it will be restricted.

A good example of the attractant is activated alumina. This is heat treated alumina which tends to attract to itself nutrients, heavy metals, and oils. The term "nutrients" includes soluble phosphates and nitrates, which are commonly used in fertilizers, and which in runoff circumstances cause unfavorable downstream effects such as nitrification of ponds and lakes. Eliminating them is a very useful feature. Preferably this material 85 will be held in an envelope 86 so flexible as to spread out in the bottom of the second screen. When the screen is turned, it will roll the envelope to expose new surfaces of its material.

This material may be used in the embodiments of FIGS. 1 and 3. It does not require the use of a supplementary screen.

This invention thereby provides in an elegantly simple arrangement an affordable and reliable system to control storm runoff water. It is readily serviced and easily installed.

This invention is not to be limited by the embodiments shown in the drawings and described in the description, which are given by way of example and not of limitation, but only in accordance with the scope of the appended claims.

What is claimed is:

1. A system to restrict and remove debris and pollutants from surface water runoff, comprising:

a receptacle having a bottom, a peripheral sidewall, an open top, and a sump, said sidewall having an outlet port therethrough above said bottom, said receptacle being adapted for insertion into a surrounding area with said rim near the level of a contiguous area whereby to receive runoff water and debris carried by it;

a grate mounted to said rim and extending across said grate having apertures therebrough sized to restrict large debris and to pass water along with debris of lesser size;

a first screen mounted to said receptacle, extending across said peripheral wall beneath said grate, said screen formed as a removable basket with a bottom, a peripheral sidewall and an open top, apertures formed through said bottom and sidewall which are sized to restrict at least some of the debris of lesser dimensions that were passed by said grate, and to permit flow of water therethrough into the sump along with some debris of still lesser dimensions; and a second screen extending laterally into said sump above and spaced from the bottom of the receptacle and directly beneath and spaced from said first screen, said second screen comprising a hollow porous body with a central, open drainage region, said second screen being mounted to said sidewall of said receptacle about said outlet port such that said open drainage region is in fluid communication with said outlet port, said second screen having pores sized to pass water, but to restrain at least some finer particles that were passed by said first screen, whereby water which flows through said second screen is substantially free of particles of objectionable size and can properly be discharged through said outlet port into a drainage system.

2. A system according to claim 1 in which a boom is placed in said first screen to restrict pollutants, said boom comprising material which is adsorbent or absorbent of hydrocarbons and oils.

3. A system according to claim 1 in which said second screen is tubular and closed at its end remote from said outlet port.

4. A systim according to claim 3 in which a quantity of attractant material is placed inside said second screen.

5. A system according to claim 4 in which said attractant material is activated alumina.

6. A system according to claim 4 in which said attractant material attracts soluble nitrates and phosphates of the type generally included in fertilizers.

7. A system according to claim 1 in which said second screen is rotatably mounted to said peripheral wall of the receptacle whereby rotation of the second screen presents a fresher upwardly-facing surface relative to water flowing onto it from said first screen.

8. A system according to claim 1 in which said first screen includes handles to facilitate its removal from the receptacle for cleaning.

9. A system according to claim 1 in which a supplementary screen is fitted inside said second screen, said supplementary screen having substantially the same screening properties as said first screen, said supplementary screen being hollow with lateral dimensions smaller than those of the second screen, thereby leaving a peripheral region between them, said supplementary screen having an open end fitted to said outlet port, whereby water which passes through said second screen next passes through said supplementary screen and thence out through the outlet port; and a weir opening into said peripheral region at a critical level in the receptacle respective to a clogged second screen, water flowing through said weir thereby by-passing said second screen, but being subjected to screening by said supplementary screen.

10. A system according to claim 9 in which a sensor responsive to water accumulated up to said critical level is placed at said critical level, whereby to be activated and provide notice of said accumulation.

11. A system according to claim 10 in which an alarm is activated by said sensor when said sensor is contacted by water at said critical level.

12. A system according to claim 9 in which said second screen is rotatably mounted to said peripheral wall of the receptacle whereby rotation of the second screen presents a fresher upwardly-facing surface relative to water flowing onto it.

13. A system according to claim 1 in which said second screen is closed at its end remote from said outlet port, and said second screen is rotatably mounted to said peripheral wall of the receptacle whereby rotation of the second screen presents a fresher upwardly-facing surface relative to water flowing into it, and said first screen includes handles to facilitate its removal from the receptacle for cleaning.

14. A system according to claim 13 including an attractant material in which said attractant material attracts soluble nitrates and phosphates of the type generally included in fertilizers.

* * * * *